(12) United States Patent
Neumann et al.

(10) Patent No.: US 8,708,094 B2
(45) Date of Patent: Apr. 29, 2014

(54) EXHAUST SYSTEM

(71) Applicant: J. Eberspächer GmbH & Co. KG, Esslingen (DE)

(72) Inventors: Felix Neumann, Esslingen (DE); Viktor Koch, Göppingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 13/724,543

(22) Filed: Dec. 21, 2012

(65) Prior Publication Data

US 2013/0161125 A1 Jun. 27, 2013

(30) Foreign Application Priority Data

Dec. 23, 2011 (DE) .......................... 10 2011 089 774

(51) Int. Cl.
*F01N 1/06* (2006.01)

(52) U.S. Cl.
USPC .......................... 181/206; 181/225; 181/228

(58) Field of Classification Search
USPC ......................................... 181/228, 225, 206
See application file for complete search history.

(56) References Cited

U.S. PATENT DOCUMENTS

| 5,446,790 | A | * | 8/1995 | Tanaka et al. ............... 381/71.14 |
| 5,574,264 | A | * | 11/1996 | Takemori et al. ............ 181/206 |
| 8,074,765 | B2 | * | 12/2011 | Goto et al. .................... 181/225 |
| 8,360,192 | B2 | * | 1/2013 | Kruger et al. ................ 180/309 |
| 2006/0027420 | A1 | | 2/2006 | Hahnl et al. |
| 2006/0037808 | A1 | | 2/2006 | Krüger et al. |
| 2008/0053747 | A1 | | 3/2008 | Krüger et al. |
| 2011/0000734 | A1 | | 1/2011 | Krueger et al. |

FOREIGN PATENT DOCUMENTS

| DE | 10 2004 040 421 | A1 | | 3/2006 | |
| DE | 10 2009 031 848 | A1 | | 1/2011 | |
| EP | 0 674 097 | A1 | | 9/1995 | |
| JP | 06093826 | A | * | 4/1994 | ............... F01N 1/00 |
| JP | 06101444 | A | * | 4/1994 | ............... F01N 1/00 |
| JP | 2001 207 843 | A | | 8/2001 | |

* cited by examiner

*Primary Examiner* — Forrest M Phillips
(74) *Attorney, Agent, or Firm* — McGlew and Tuttle, P.C.

(57) ABSTRACT

An exhaust system (1) for an internal combustion engine, in particular of a motor vehicle, has at least one exhaust tract (2), which has at least one exhaust pipe (3) which conducts exhaust gas, and has at least one active silencer (5). The active silencer (5) has a silencer housing (6) and at least one electroacoustic converter (7), which is arranged in the silencer housing (6). At least one connection pipe (8) connects the silencer housing (6) fluidically to the exhaust pipe (3). The thermal loading of the converter (7) can be reduced if a sound propagation path (9) formed for the propagation of airborne noise in the connection pipe (8) is impermeable to thermal radiation (16) emanating from the exhaust gas in the exhaust pipe (3).

20 Claims, 5 Drawing Sheets

EXHAUST SYSTEM

CROSS REFERENCE TO RELATED APPLICATIONS

This application claims the benefit of priority under 35 U.S.C. §119 of German Patent Application DE 10 2011 089 774.7 filed Dec. 23, 2011, the entire contents of which are incorporated herein by reference.

FIELD OF THE INVENTION

The present invention relates to an exhaust system for an internal combustion engine, in particular of a motor vehicle.

BACKGROUND OF THE INVENTION

An exhaust system usually comprises at least one exhaust tract, which has at least one exhaust pipe which guides exhaust gas. The respective exhaust tract is used to discharge exhaust gas which is produced in the combustion chambers of the internal combustion engine. Depending on the size of the internal combustion engine, the exhaust system manages with a single exhaust tract or comprises at least two exhaust tracts, for example in the case of a V engine. Exhaust gas treatment devices are usually arranged in the respective exhaust tract, such as catalysts, particle filters, SCR systems and silencers, which are connected to each other by means of exhaust pipes. An exhaust tract usually comprises an exhaust manifold on the input side, while an end pipe, what is known as an "exhaust", is arranged at the end. These end components can also be connected to exhaust pipes.

In the case of silencers (also known as mufflers), a distinction is drawn between passive silencers and active silencers. The passive silencers damp the airborne noise transported in the exhaust gas by means of resonance, reflection, expansion and/or absorption effects. In contrast to this, an active silencer operates with active noise control or antinoise, which is produced with the aid of a corresponding electro-acoustic converter, which is generally a loudspeaker. Combinations of active and passive silencers are likewise possible. In the present connection, it should in particular be avoided that an active silencer operates exclusively with antinoise. Rather, in the context of the present invention, an active silencer should optionally be able to comprise properties and/or components of a passive silencer also, such as at least one resonance, reflection, expansion and/or adsorption chamber.

An active silencer can have a silencer housing and at least one electro-acoustic converter arranged in the silencer housing, and at least one connection pipe. The silencer housing can be connected fluidically to the exhaust pipe with the aid of the connection pipe. In this manner, the silencer housing is bypass-connected to the exhaust tract, so the exhaust gas does not flow through it. The fluid connection between the silencer housing and the exhaust pipe, which is created with the aid of the connection pipe, ensures an acoustic coupling for airborne noise, so the noise carried in the exhaust gas can propagate in the direction of the silencer housing, while the noise generated by the electro-acoustic converter can be radiated into the exhaust pipe. A physical distance between the silencer housing and the exhaust pipe is also realized by means of the connection pipe, as a result of which the thermal loading of the converter can be reduced. It has been found, however, that the hot exhaust gases conducted in the exhaust pipe can still result in high thermal loading of the converter. Firstly, the hot exhaust gas can enter the connection pipe and reach the converter by means of diffusion processes. Secondly, the exhaust gas heats up the exhaust pipe, so heat can pass by thermal conduction from the exhaust pipe via the connection pipe to the silencer housing. Finally, thermal radiation can also spread from the exhaust gas or from the exhaust pipe through the connection pipe to the converter.

In order to reduce the thermal loading of the converter and of any electronics of the active silencer arranged in the silencer housing, it is possible in principle to equip the connection pipe with a cooler section between the silencer housing and the exhaust pipe. In this manner, the connection pipe can be cooled in that heat is emitted outwardly via the cooler section. For example, the connection pipe can have outwardly projecting cooling ribs in the cooler section. It is likewise conceivable to form a cooling jacket through which a coolant flows in the cooler section. For example, this cooling jacket can be fluidically coupled to a cooling circuit of the internal combustion engine equipped with the exhaust system.

SUMMARY OF THE INVENTION

The present invention is concerned with the problem of providing an improved or at least a different embodiment for an exhaust system of the type mentioned at the beginning, which in particular has reduced thermal loading of the converter.

According to the invention, an exhaust system for an internal combustion engine of a motor vehicle is provided. The system comprises an exhaust tract comprising at least one exhaust pipe which conducts exhaust gas and an active silencer comprising a silencer housing and an electro-acoustic converter arranged in the silencer housing and a connection pipe which connects the silencer housing fluidically to the exhaust pipe. A sound propagation path, formed in the connection pipe for the propagation of airborne noise, is impermeable to thermal radiation emanating from the exhaust gas in the exhaust pipe.

The invention is based on the general concept of configuring the acoustic coupling path created for airborne noise with the aid of the connection pipe in such a manner that it is impermeable to thermal radiation. In this manner thermal radiation is prevented from passing directly from the exhaust gas stream in the exhaust pipe or from the exhaust pipe through the connection pipe to the converter. In this manner the thermal loading of the converter by thermal radiation can be significantly reduced.

The reduced thermal loading of the converter and of any other electronic components in the silencer housing also makes it possible to arrange the active silencer further upstream, closer to the internal combustion engine, than has been previously possible. An arrangement close to the engine can be advantageous for certain requirements.

According to a first general solution, the use of at least one screen element is proposed, which is arranged in a cross section of the connection pipe in such a manner that the connection pipe remains permeable to airborne noise, while the at least one screen element closes off the cross section of the connection pipe in an opaque manner (blocking the passage of radiant energy—a line of sight blocking manner) in a viewing direction running parallel to the longitudinal center axis of the connection pipe. With the aid of the respective screen element, the passage of thermal radiation through the connection pipe can thus likewise be effectively prevented, while the propagation of the airborne noise through the connection pipe is largely unhindered. The thermal loading of the converter can also be significantly reduced thereby. The use of such a screen element makes it possible to use a straight connection pipe, which can be realized in a particularly cost-effective manner and is accordingly preferred. In principle, the alternative solutions proposed here can also be combined with each other, so that a curved connection pipe is provided, the cross section of which is closed off in an opaque manner in the viewing direction with at least one screen element.

The use of at least one such screen element at the same time increases the thermal mass of the connection pipe in the region of the at least one screen element, so that thermal loading can propagate from the exhaust pipe in the direction of the silencer housing only in a time-delayed or damped manner.

According to an advantageous embodiment, it can be provided for the connection pipe to have a section between the silencer housing and the exhaust pipe which contains the cross section of the connection pipe which is closed off in an opaque manner in the viewing direction by means of the at least one screen element, this section being a tubular body which is separate from the connection pipe and is installed in the connection pipe. This simplifies the formation of variants for adapting the connection pipe to different installation situations, it always being possible for the same cut section or tubular body to be used to realize the opaque blocking cross-sectional region.

According to another advantageous embodiment, it can be provided for the at least one screen element to be arranged in a cooler section of the connection pipe, so that the respective screen element is arranged such that it is permeable to airborne noise and closes off the cross section of the cooler section in an opaque manner in a viewing direction running parallel to the longitudinal center axis of the cooler section. The positioning of the respective screen element in the cooling section means that the heat transmitted to the respective screen element by thermal radiation can be dissipated from the respective screen element to a cooler wall of the cooler section which encloses the cross section of the connection pipe in the circumferential direction and discharged through a cooling system of the cooler section which may be provided. In this respect, cooling of the respective screen element can be realized by the positioning of the respective screen element in the cooler section, which improves the efficiency of the thermal protection of the converter. In this case it is also of particular significance that the respective screen element contributes to increasing the thermal mass of the cooler section. In the case of a combination of the two above-mentioned embodiments, the section of the connection pipe which is configured as a separate tubular body corresponds to the cooler section, which is then installed in the connection pipe in the form of the separate tubular body.

The respective screen element can expediently be a sheet metal body, which has high thermal conductivity and heat resistance. Expediently, a plurality of such screen elements is provided, which project inwardly from a pipe wall of the connection pipe or from the above-mentioned cooler wall of the cooler section. The use of a plurality of screen elements allows a configuration of the screen elements such that they only insignificantly hinder the propagation of airborne noise along the sound propagation path. Alternatively to a plurality of screen elements, which each project inwards from the pipe wall or from the cooling wall, the screen element can also be formed by a perforated metal sheet, which closes off the cross section of the connection pipe or of the cooler section, it being possible for the holes in the perforated metal sheet to be formed by putting out tabs, the said tabs expediently being formed in such a manner that they block the associated openings in the viewing direction.

According to a preferred embodiment, the screen elements are however configured as vanes which are placed at an angle to the longitudinal center axis. Such vanes, which can also be referred to as guide vanes in a pipe through which flow passes, which is not the case with the connection pipe here, have comparatively low acoustic resistance, so the vanes only hinder the sound propagation path slightly.

According to an advantageous development, the screen elements can be arranged in a star-shaped manner, as a result of which a rotational symmetry is produced for the interaction of the screen elements with the sound propagation path. The screen elements arranged in a star-shaped manner can be arranged such that they are free-standing on the radial inner side, so that they do not touch each other. Alternatively, it is likewise possible that the screen elements arranged in a star-shaped manner rest on each other at a common center. The free-standing arrangement avoids thermally induced stresses. However, a common center allows the screen elements to be realized as a unit which can be inserted into the respective cross section as a separate component. If the screen elements arranged in a star-shaped manner are configured as vanes, the arrangement of the screen elements can be configured like a static mixer and in particular in the form of a swirl generator. As the exhaust gas does not flow through the connection pipe, there is no mixing or swirl generation, but opaque closing off of the respective cross section in the region of the screen elements, with an open and largely unhindered sound propagation path.

According to another advantageous embodiment, the screen elements can extend at least along the cooler wall in the longitudinal direction of the connection pipe or of the cooler section and in the circumferential direction. The sound propagation path thus follows a curved path, which forms a negligible obstacle for the sound propagation but forms an insurmountable obstacle for straight thermal radiation.

In another embodiment, the screen elements can be configured as straight vanes which run parallel to each other. In particular, the screen elements can be designed as a vane grid.

According to another expedient embodiment, a leading edge of a screen element can overlap a leading edge of an adjacent screen element in the viewing direction or align therewith in the viewing direction. In this manner, it is achieved in a particularly simple manner that the individual screen elements each block a section of the cross section of the connection pipe or of the cooler section in the viewing direction in such a manner that all the screen elements together close off in particular the entire cross section in the viewing direction in an opaque manner, while at the same time sufficient gaps or distances are present between adjacent screen elements to allow largely unhindered passage for airborne noise.

According to another advantageous embodiment, the above-mentioned cooler section can have a plurality of cooling ribs, which project outwardly from the cooler wall of the cooler section. This measure significantly increases the surface area of the cooler section which is available for heat dissipation, which improves the emission of heat into the environment of the connection pipe.

According to an expedient development, the cooling ribs can be aligned parallel to the longitudinal center axis of the cooler section and arranged in a star-shaped manner or parallel to each other. The star-shaped arrangement improves heat dissipation. The parallel arrangement however simplifies the production of the cooler section with the cooling ribs as an integral unit, in particular as a cast part.

According to another advantageous embodiment, a cooling airstream generator can be provided, which generates a cooling airstream which is applied to the cooler section from the outside. In this manner, the cooler section is actively cooled, namely by means of the cooling airstream generated specifically for the purpose. Alternatively, it is in principle possible for the cooler section to be equipped with a cooling jacket, which is connected to a cooling circuit in which a coolant, preferably a cooling liquid, circulates. For example, such a cooling circuit can be coupled to a cooling circuit of the internal combustion engine.

According to another advantageous embodiment, the respective screen element can be configured as a hollow body, and coolant, preferably a cooling liquid, can flow through it. The respective screen element is then connected through the cooler wall of the cooler section to a cooling circuit in which the coolant circulates. This cooling circuit can in particular be coupled to a cooling circuit of the internal combustion engine. Moreover, it is in principle possible to combine the screen elements which are cooled actively with a coolant to the above-mentioned cooling jacket for cooling the cooler section.

According to another advantageous embodiment, the above-mentioned cooler section can be a tubular body which is separate from the connection pipe and is installed in the connection pipe in a suitable manner, for example by means of welded connections or flange connections. It is in particular possible thereby to produce the cooler section from a different material from the connection pipe. For example, the connection pipe can be produced from an iron alloy or from a steel alloy, while the tubular body of the cooler section is produced from a lightweight metal alloy which has much better thermal conductivity. Furthermore, the separate tubular body of the cooler section allows an embodiment in which the connection pipe is produced from different materials on both sides of the cooler section. The connection pipe can thus be produced from a metallic material for example from the cooler section to the exhaust pipe, while it can be produced from a plastic from the cooler section to the silencer housing.

According to another advantageous embodiment, the respective screen element can be formed integrally on the pipe wall of the connection pipe or on the cooling wall of the cooler section. The integral construction then makes the production of the active silencer and the exhaust system easier. In particular, the integral construction makes it easier to realize the above-mentioned tubular body as a monolithic cast part. Additionally or alternatively, the above-mentioned cooling ribs of the cooler section can be formed integrally on the said cooler wall, which also makes cost-effective production as a cast part easier. In particular, the cooler section can then be realized in the form of a monolithic tubular body, which can integrally comprise the at least one screen element and optionally also the cooling ribs.

According to a second general solution, it is proposed that the connection pipe be curved in such a manner that there is no straight, continuous radiation path from the exhaust pipe to the silencer housing through the connection pipe. Direct heating of the converter by thermal radiation can thus be avoided. To this end, the connection pipe can have for example a 90° bend or an S-bend. In this case too, the connection pipe can have a cooler section which is actively and/or passively cooled.

It is self-evident that the features which are mentioned above and those which are still to be explained below can be used not only in the combination specified in each case, but also in other combinations or alone without departing from the scope of the present invention.

Preferred exemplary embodiments of the invention are shown in the drawings and are explained in more detail in the following description, with the same reference symbols referring to the same or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
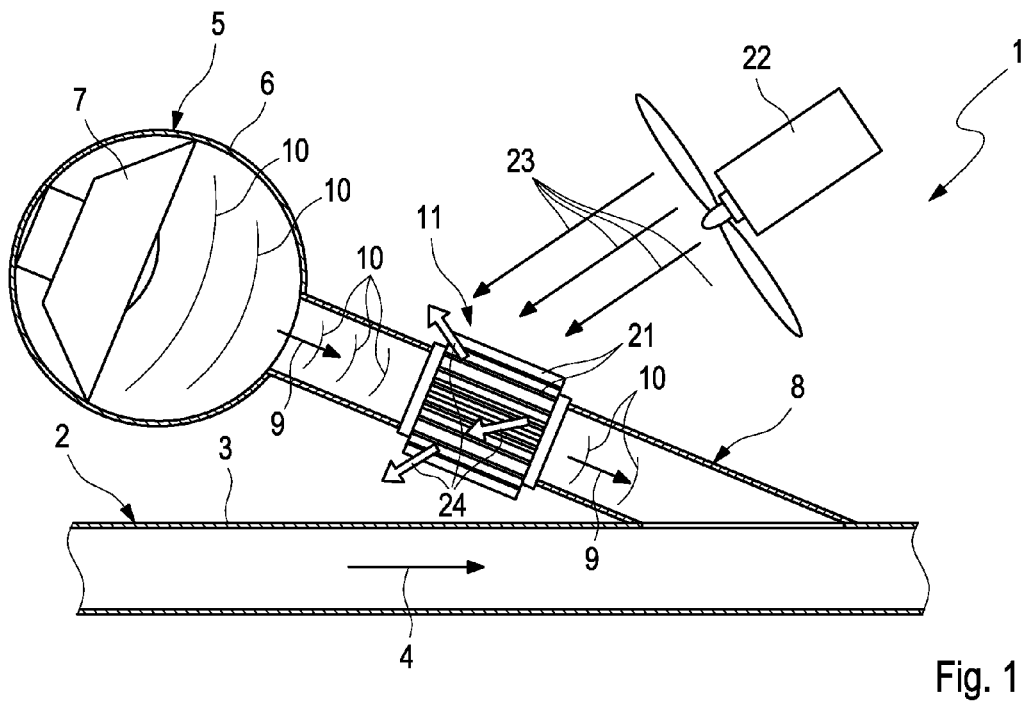
FIG. 1 is a schematic sectional view showing a longitudinally cut away of a cooler section of an exhaust system in the region of an active silencer.

Referring to the drawings in particular, according to FIGS. 1 to 4, an exhaust system 1, which is only partially shown here and is used to discharge exhaust gas in an internal combustion engine, which is preferably arranged in a motor vehicle, comprises at least one exhaust tract 2, which has at least one exhaust-gas-conducting exhaust pipe 3. An exhaust gas stream in the exhaust pipe 3 is indicated by an arrow and referred to with 4 in FIGS. 1 and 2. The exhaust system 1 comprises at least one active silencer 5. This has a silencer housing 6 and at least one electro-acoustic converter 7, which is arranged in the silencer housing 6. Furthermore, a connection pipe 8 is provided, via which the silencer 5 is acoustically connected to the exhaust pipe 3. To this end, the connection pipe 8 connects the silencer housing 6 fluidically to the exhaust pipe 3. To do this, the connection pipe 8 defines a sound propagation path 9, which is indicated by arrows, is formed in the connection pipe 8 and allows the propagation of airborne noise. In FIGS. 1 to 4, pressure pulses 10 are indicated, which represent propagation of airborne noise along the sound propagation path 9 from the converter 7 in the direction of the exhaust pipe 3. These pressure pulses 10 are phase-shifted in relation to pressure pulses of a noise to be damped which is carried in the exhaust gas stream 4.

In the preferred example shown of the exhaust system 1, the connection pipe 8 comprises a cooler section 11, which is arranged in the connection pipe 8 between the silencer housing 6 and the exhaust pipe 3. In another embodiment, such a cooler section 11 can in principle be dispensable.

According to FIGS. 1 to 13, the cooler section 11 comprises a cooler wall 12, which completely encloses a cross section 13 of the connection pipe 8 and/or a cross section 13 of the cooler section 11 in the circumferential direction. Further, the cooler section 11 has a straight construction and correspondingly has a straight longitudinal center axis 14, which coincides with a longitudinal center axis 15 of the connection pipe 8 in the preferred embodiment shown in FIGS. 1 and 2, in which the connection pipe 8 is straight.

Figure 2:
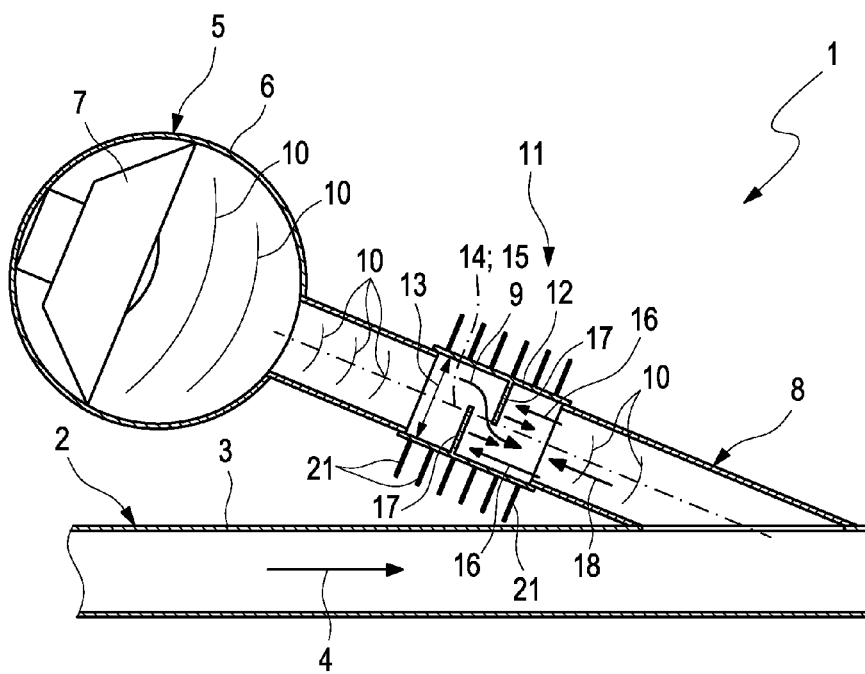
FIG. 2 is a schematic sectional view showing a view as in FIG. 1 with a longitudinally cut away cooler section.
Figure 5:
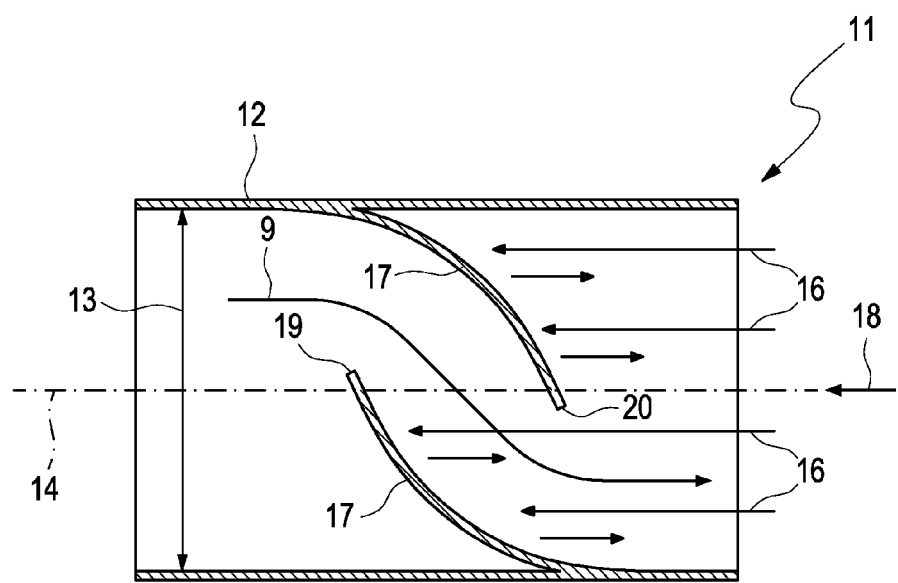
FIG. 5 is a highly simplified longitudinal sectional view through the cooler section.

The sound propagation path 9 is configured to be impermeable to thermal radiation 16, which is indicated by arrows in FIGS. 2 and 5 and emanates from the exhaust gas or exhaust gas stream 4 in the exhaust pipe 3. The thermal loading of the converter 7 by thermal radiation 16 can thereby be considerably reduced.

Figure 3:
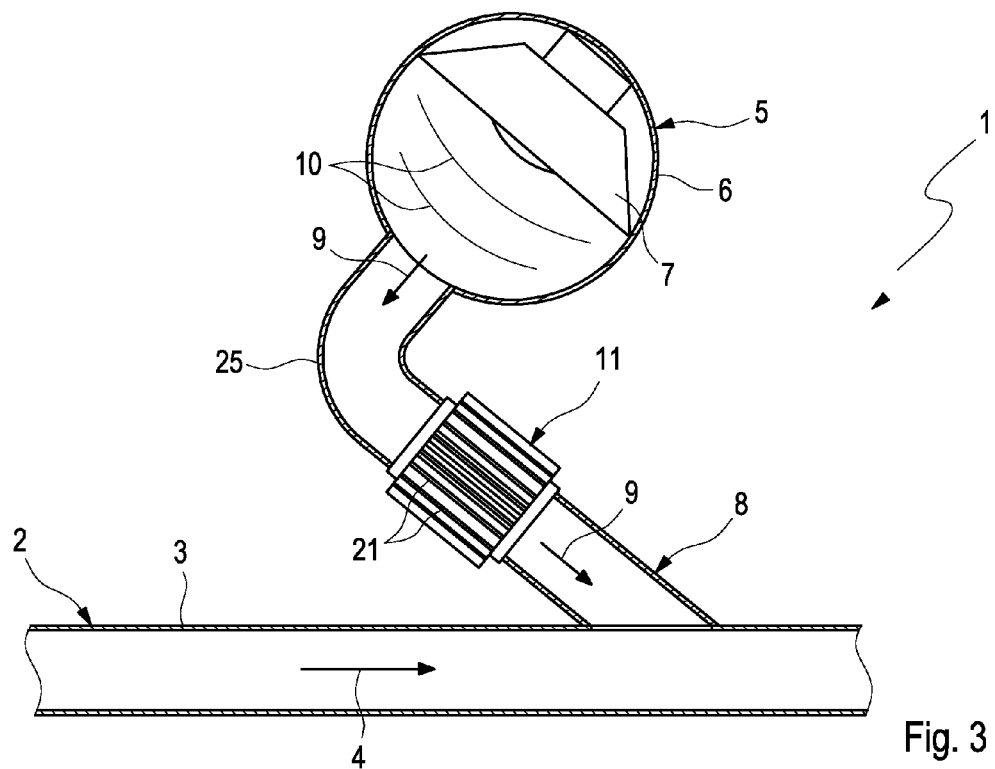
FIG. 3 is a schematic sectional view showing a view as in FIG. 1, but with a different embodiment.
Figure 4:
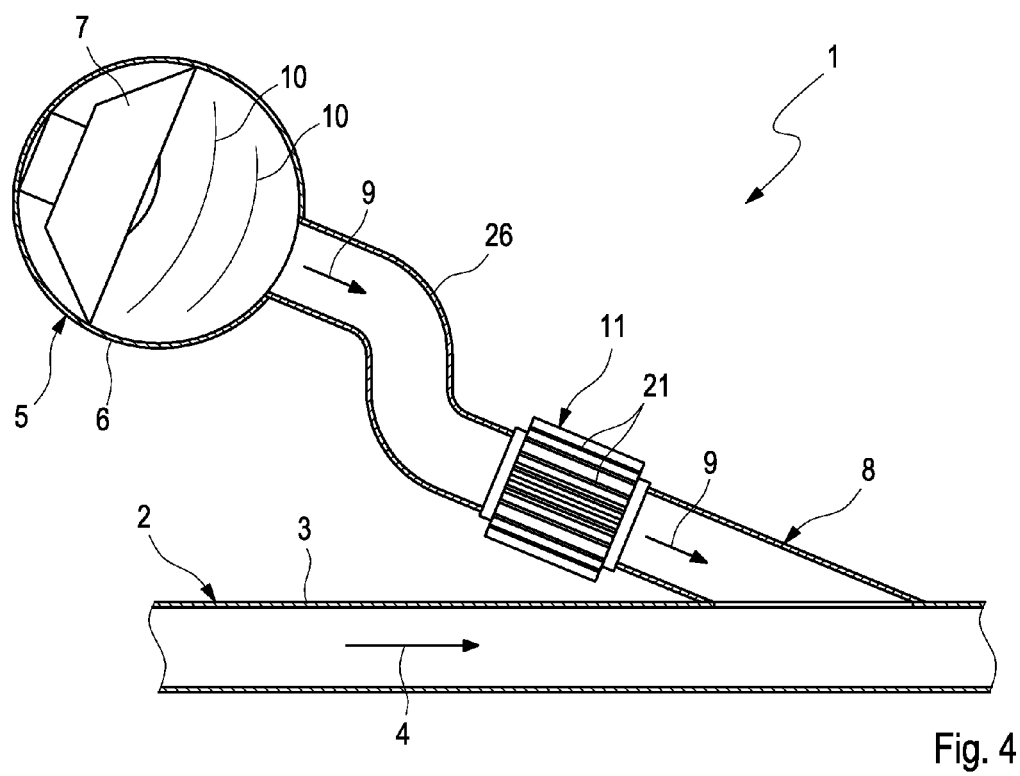
FIG. 4 is a schematic sectional view showing a view as in FIG. 3, but with a further embodiment.

In a particularly simple case, which is shown here in FIGS. 3 and 4, the sound propagation path 9 can be designed to be impermeable to thermal radiation 16 in that the connection pipe 9 is curved in such a manner that no straight connection leads in an unhindered manner from the exhaust pipe 3 to the silencer housing 6 through the connection pipe 8. For example, FIG. 3 shows a connection pipe 8, which has a 90° bend 25 between the exhaust pipe 3 and the silencer housing 6, which bend prevents propagation of the thermal radiation in a straight line from the exhaust pipe 3 to the silencer housing 6. FIG. 4 shows a variant in which the connection pipe 8 has an S-shaped bend 26 or S-bend 26 or S-profile 26, which likewise prevents propagation of thermal radiation in a straight line from the exhaust pipe 3 to the silencer housing 6.

In contrast to this, a straight connection pipe 8 is used in the embodiments shown in FIGS. 1 and 2. The features described below can however in principle also be realized in a curved connection pipe 8.

In order to make the sound propagation path 9 impermeable to thermal radiation 16 in a straight connection pipe 8, in this case a plurality of screen elements 17 is provided in the cross section 13 of the connection pipe 8 or of the cooler section 11, which screen elements are arranged in the connection pipe 8 or in this case in the cooler section 11 in such a manner that the arrangement of the screen elements 17 is permeable to airborne noise, while it closes off the cross section 13 of the cooler section 11 in an opaque manner in a viewing direction 18 running parallel to the longitudinal center axis 14 of the cooler section 11. Although a plurality of screen elements 17 is always provided in the exemplary embodiments shown here, an embodiment in which only a single screen element 17 is present to block the cross section 13 in an opaque manner is also conceivable.

The screen elements 17 are expediently produced from a metallic material. For example, they can be sheet metal bodies. The screen elements 17 project inwardly from the cooler wall 12 and thus into the cross section 13. In the embodiments shown here, the screen elements 17 are each configured as vanes which are placed at an angle to the longitudinal center axis 14. According to the embodiments of FIGS. 6 to 11, the screen elements 17 can expediently be arranged in a star-shaped manner, wherein the individual screen elements 17 can rest on each other on the radially inner side at a common center. It is likewise possible to arrange the screen elements 17 in such a manner that they are free-standing on the radially inner side and do not touch each other. In the embodiments of FIGS. 6 to 11, the screen elements 17 are arranged in such a manner that they have the structure of a swirl generator. The screen elements 17 can generally be arranged in the manner of a static mixer.

Figure 12:
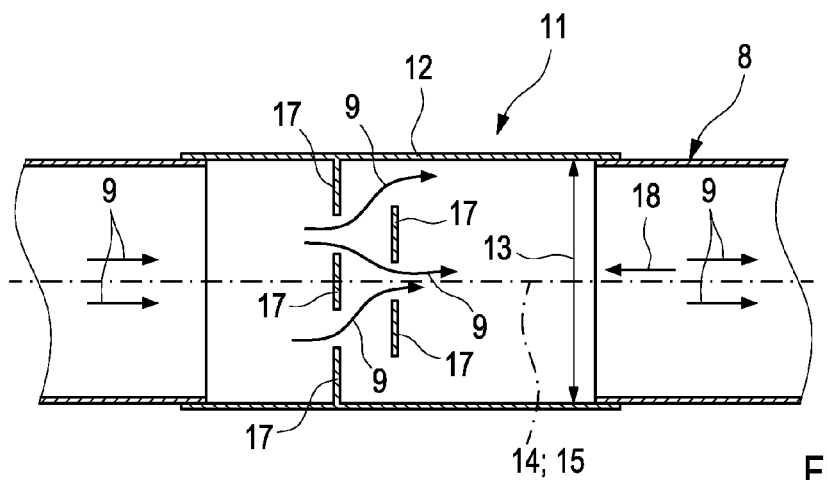
FIG. 12 is a schematic highly simplified longitudinal sectional view of the exhaust system in the region of a cooler section in another embodiment.
Figure 13:
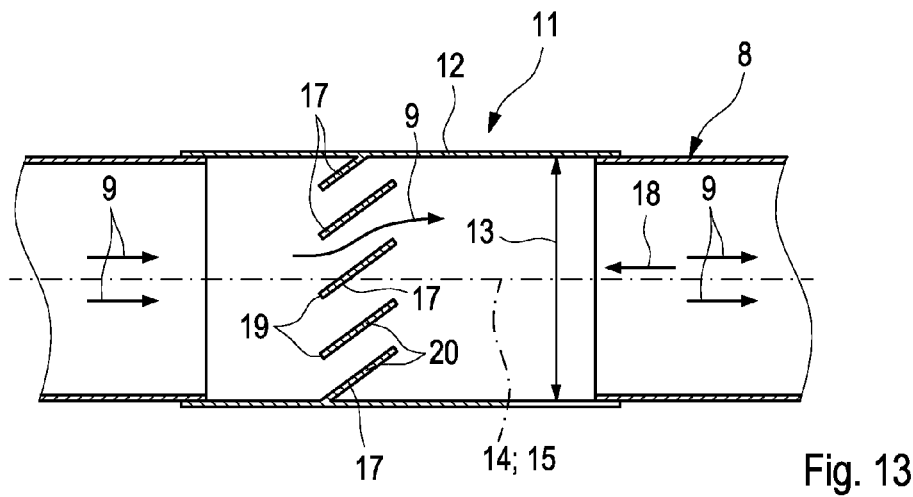
FIG. 13 is a schematic longitudinal sectional view as in FIG. 12, but with a further embodiment.
Figure 8:
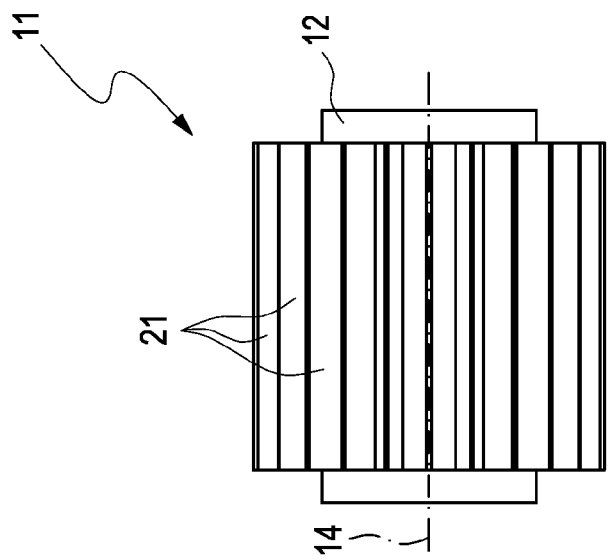
FIG. 8 is a schematic side view of the cooler section of FIG. 6.
Figure 7:
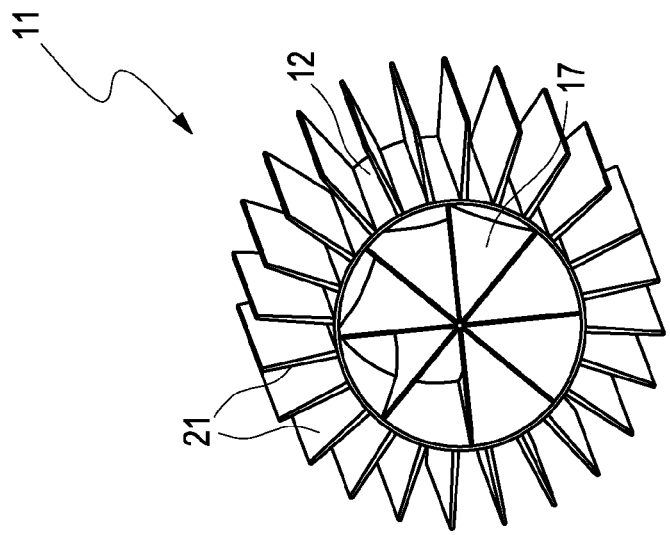
FIG. 7 is a schematic isometric view of the cooler section of FIG. 6.
Figure 6:
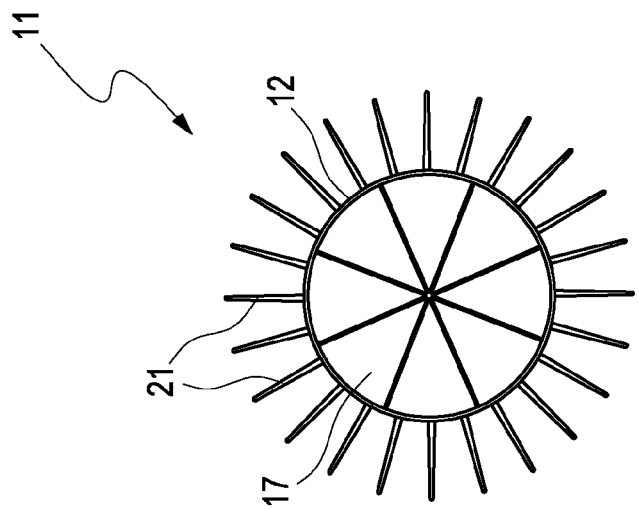
FIG. 6 is a schematic cross sectional view of a cooler section.
Figure 11:
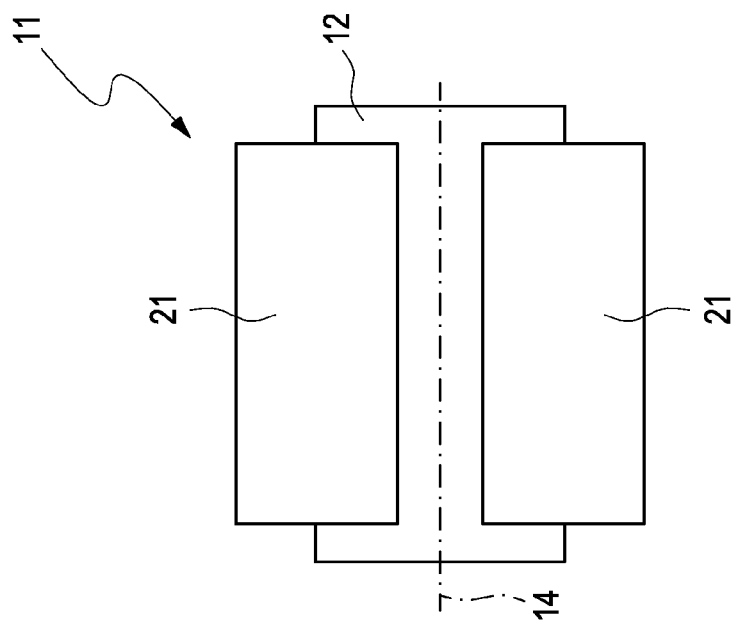
FIG. 11 is a schematic side view of the cooler section of FIG. 9.
Figure 10:
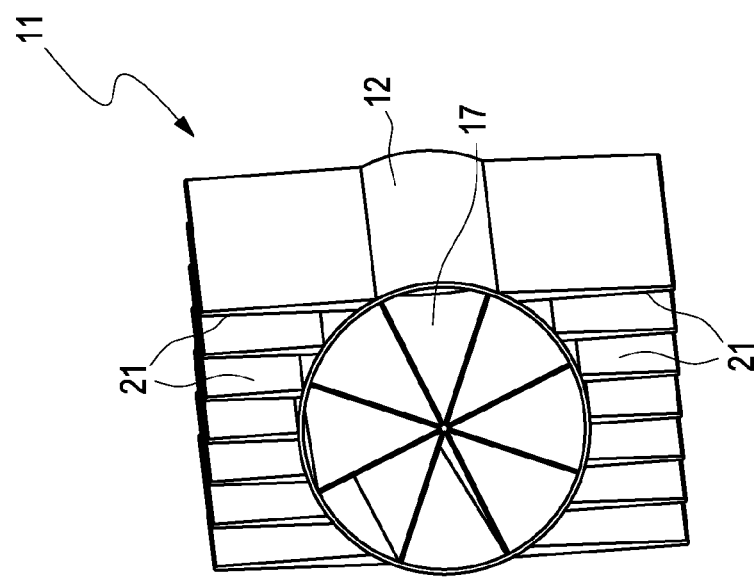
FIG. 10 is a schematic isometric view of the cooler section of FIG. 9.
Figure 9:
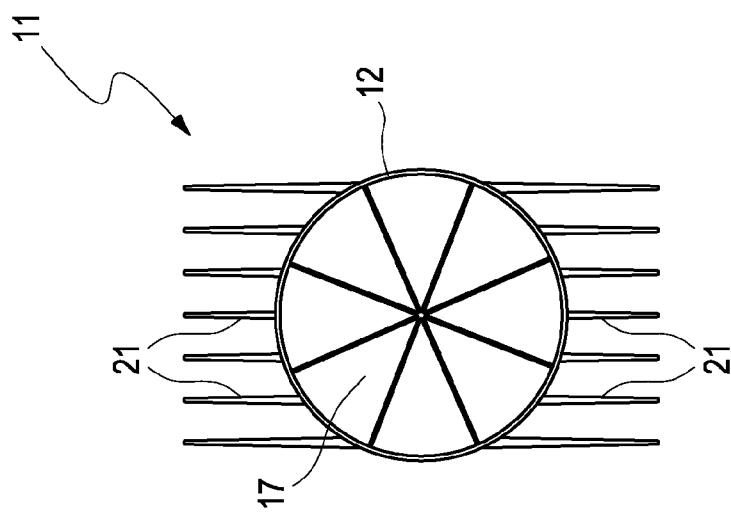
FIG. 9 is a schematic cross sectional view of the cooler section as in FIG. 6, but with a different embodiment.

FIGS. 2, 12 and 13 show embodiments in which the screen elements 17 are designed as straight vanes which run parallel to each other. The screen elements 17 of FIGS. 2 and 12 are placed at 90° with respect to the longitudinal center axis 14, so that they extend with their surface perpendicular to the longitudinal center axis 14. Furthermore, in the embodiments of FIGS. 2 and 12, the screen elements 17 are arranged offset to each other in the axial direction, that is, parallel to the longitudinal center axis 14. Furthermore, the screen elements 17 which are axially offset with respect to each other are also offset to each other transversely to the longitudinal center axis 14 in such a manner that the desired opaque blocking of the cross section 13 is produced in the viewing direction 18.

In the embodiment shown in FIG. 13, the vane-shaped screen elements 17 which extend parallel to each other are placed at approximately 45° with respect to the longitudinal center axis 14. Further, the screen elements 17 are in this case dimensioned in such a manner that an overlap is produced in the viewing direction 18 to block the cross section 13 in an opaque manner.

In the embodiments of FIGS. 2 and 5 to 13, preferably of FIGS. 5 to 11 and 13, shown here, a first edge 19 of a screen element 17 is arranged in the viewing direction 18 such that it overlaps or is flush with a second edge 20 of an adjacent screen element 17. The first edge 19 faces the silencer housing 6, whereas the second edge 20 faces away from the silencer housing 6.

According to FIGS. 1 to 4 and 6 to 11, the cooler section 11 expediently has a plurality of cooling ribs 21, which project outwardly from the cooler wall 12. According to FIGS. 1 and 3 to 11, the cooling ribs 21 are expediently aligned parallel to the longitudinal center axis 14 of the cooler section 11. Alternatively, FIG. 2 shows an embodiment in which the cooling ribs 21 are configured in a ring-shaped manner and extend in the circumferential direction as well as perpendicularly to the longitudinal center axis 14 of the cooler section 11. In the embodiments of FIGS. 1 and 3 to 8, the cooling ribs 21 extend in a star-shaped manner. However, in the embodiment shown in FIGS. 9 to 11, the cooling ribs 21 extend parallel to each other.

In FIG. 1 a cooling airstream generator 22 is shown, which is in this case indicated by a fan. With the aid of the cooling airstream generator 22, a cooling airstream 23 can be generated, which is indicated by arrows here, and which is applied to the cooler section 11 from the outside. Heat can thereby be discharged into the environment according to arrows 24.

The cooler section 11 is expediently a tubular body which is separate from the connection pipe 8 and is installed in the connection pipe 8 in a suitable manner, see in particular the diagrams of FIGS. 12 and 13. The screen elements 17 and/or the cooling ribs 21 can in particular be formed integrally on the cooler wall 12. The cooler section 11 is thus expediently a monolithic cast part, which integrally comprises the cooler wall 12 and the screen elements 17 and optionally the cooling ribs 21.

According to FIGS. 2 and 5, the thermal radiation 16 coming from the exhaust pipe 3 is partially reflected and partially absorbed at the screen elements 17 owing to the configuration of the sound propagation path 9, which is impermeable to thermal radiation 16, or owing to the opaque blocking arrangement of the screen elements 17. The reflected heat does not contribute to the heating of the screen elements 17. The absorbed heat however heats the screen elements 17. Owing to their thermal conductivity, the screen elements 17 can transmit the absorbed heat to the cooler wall 12. In the examples, the absorbed heat passes from the cooler wall 12 into the cooling ribs 21 and can be emitted by the latter into the environment. If necessary, this emission of heat can be assisted by the cooling airstream 23. It can optionally also be provided for the screen elements 17 to be connected to a cooling circuit in which a liquid coolant circulates in such a manner that this coolant flows through the screen elements 17.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine of a motor vehicle, the system comprising:
   an exhaust tract comprising at least one exhaust pipe which conducts exhaust gas; and
   an active silencer comprising a silencer housing and an electro-acoustic converter arranged in the silencer housing and a connection pipe which connects the silencer housing fluidically to the exhaust pipe;
   a cooler section located between the silencer housing and the exhaust pipe;
   a plurality of screen elements which each project inwardly from said cooler section, said screen elements being exposed to the exhaust gas, wherein heat is transferred from said screen elements to an outer surface of said cooler section, each of said plurality of screen elements being permeable to airborne noise, said plurality of screen elements cooperating to close off a cross section of said connection pipe in an opaque manner such that a line of sight path is blocked in a viewing direction extending parallel to a longitudinal center axis of said connection pipe, wherein a sound propagation path, formed in the connection pipe for the propagation of airborne noise, is impermeable to thermal radiation emanating from the exhaust gas in the exhaust pipe via at least said plurality of screen elements.

2. The exhaust system according to claim 1, wherein at least a portion of said each of said screen elements overlaps with a portion of another one of said screen elements with respect to said longitudinal center axis of the connection pipe.

3. The exhaust system according to claim 1, further comprising a tubular body which is separate from the connection pipe and is installed in the connection pipe, the tubular body forming a section between the silencer housing and the exhaust pipe, which section has a cross section which is closed off in said opaque manner in said viewing direction by said screen elements, said tubular body comprising said cooler section, wherein said screen elements are integrally connected to said tubular body to form a one-piece tubular body structure, said tubular body having a tubular body inner surface, said connection pipe having a connection pipe outer surface, at least a portion of said tubular body inner surface engaging said connection pipe outer surface, said connection pipe comprising a bent portion, said bent portion being arranged between said silencer housing and said cooler section.

4. The exhaust system according to claim 1, wherein:
   the connection pipe comprises said pipe cooler section between the silencer housing and the exhaust pipe, the cooler section comprising a cooler wall which encloses a cross section of the connection pipe in a circumferential direction;
   said screen elements are arranged in the cooler section.

5. The exhaust system according to claim 1, wherein at least a portion of each of said plurality of screen elements is located at a spaced location from another one of said plurality of screen elements.

6. The exhaust system according to claim 5, wherein the screen elements are configured as vanes which are placed at an angle to the longitudinal center axis.

7. The exhaust system according to claim 6, wherein the vanes are placed at an angle to the longitudinal center axis and/or are straight.

8. The exhaust system according to claim 5, wherein:
   the screen elements are arranged in a star-shaped manner or run parallel to each other, and/or
   the screen elements extend at least along a pipe wall or a cooler wall of said cooler section of the connection pipe in a longitudinal direction of the connection pipe or of the cooler section and in the circumferential direction.

9. The exhaust system according to claim 5, wherein an edge of one of the screen elements which faces the converter overlaps an edge of an adjacent one of the screen elements which faces away from the converter in a viewing direction running parallel to the longitudinal center axis of the connection pipe, or aligns therewith in the viewing direction, wherein said connection pipe is located at an acute angle with respect to said at least one exhaust pipe.

10. The exhaust system according to claim 4, wherein the cooler section comprises a plurality of cooling ribs which project outwards from the cooler wall.

11. The exhaust system according to claim 10, wherein the cooling ribs are aligned parallel to the longitudinal center axis of the cooler section and are arranged in a star-shaped manner or parallel to each other.

12. The exhaust system according to claim 4, further comprising:
    a cooling airstream generator, which generates a cooling airstream which is applied to the cooler section from an outside.

13. The exhaust system according to claim 4, wherein the cooling section comprises a tubular body which is separate from the connection pipe and is installed in the connection pipe, said tubular body comprising said plurality of screen elements and said cooler section, said plurality of screen elements being integrally connected to said tubular body to form a one-piece tubular body.

14. The exhaust system according to claim 4, wherein:
    said plurality of screen elements is formed integrally on a pipe wall or on the cooler wall and/or
    cooling ribs are formed integrally on the cooler wall.

15. The exhaust system according to claim 1, wherein the connection pipe is curved in such a manner that no straight connection leads unhindered through the connection pipe from the exhaust pipe to the silencer housing, said connection pipe comprising a bent portion, said bent portion being located between said silencer housing and said cooler section.

16. An exhaust system for an internal combustion engine, the system comprising:
    an exhaust pipe which conducts exhaust gas from the internal combustion engine;
    an active silencer comprising a silencer housing and an electro-acoustic converter arranged in said silencer housing and a sound propagation path comprising connection pipe, said sound propagation path connecting said silencer housing fluidically to said exhaust pipe; and
    a thermal radiation blocking means, connected to said sound propagation path, for blocking thermal radiation emanating from the exhaust gas from reaching said silencer housing whereby thermal radiation is prevented from passing from an exhaust gas stream in the exhaust pipe or from the exhaust pipe through the connection pipe to the converter, said thermal radiation blocking means comprising a tubular body and a plurality of screen elements, said tubular body being integrally connected to said plurality of screen elements to form a one-piece structure, said plurality of screen elements being exposed to the exhaust gas, each of said screen elements being permeable to airborne noise, said plurality of screen elements closing off a line of sight path of said connection pipe in a viewing direction extending parallel to a longitudinal center axis of said connection pipe.

17. The exhaust system according to claim 16, wherein said tubular body is separate from said connection pipe and is installed in line with said connection pipe, said tubular body forming a section between said silencer housing and said exhaust pipe, which section has a cross section which closes off a line of sight path in said viewing direction by said screen elements.

18. The exhaust system according to claim 16, wherein said thermal radiation blocking means comprises a curve in said connection pipe such that no straight line of sight path is provided through said connection pipe from said exhaust pipe to said silencer housing, said connection pipe comprising a bent portion arranged between said tubular body and said silencer housing.

19. The exhaust system according to claim 16, wherein:
said connection pipe comprises a cooler section between said silencer housing and said exhaust pipe;
said cooler section comprises a cooler wall which encloses a cross section of said connection pipe in a circumferential direction;
said thermal radiation blocking means comprises screen elements arranged in said cooler section, each of said screen elements projecting in an inward direction from a wall of said cooler section, said connection pipe being located at an acute angle with respect to said exhaust pipe.

20. The exhaust system according to claim 16, wherein said tubular body has a tubular body inner surface, said connection pipe having a connection pipe outer surface, at least a portion of said tubular body inner surface engaging said connection pipe outer surface, at least a portion of each of said screen elements overlapping with a portion of another one of said screen elements with respect to said longitudinal center axis of said connection pipe.

* * * * *